(12) United States Patent
Subramanian et al.

(10) Patent No.: US 8,709,304 B2
(45) Date of Patent: Apr. 29, 2014

(54) HYDROTHERMAL SYNTHESIS OF NANOCUBES OF SILLENITE TYPE COMPOUNDS FOR PHOTOVOLTAIC APPLICATIONS AND SOLAR ENERGY CONVERSION OF CARBON DIOXIDE TO FUELS

(75) Inventors: Vaidyanathan Subramanian, Sparks, NV (US); Sankaran Murugesan, Austin, TX (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 390 days.

(21) Appl. No.: 12/967,922

(22) Filed: Dec. 14, 2010

(65) Prior Publication Data

US 2011/0155971 A1    Jun. 30, 2011

Related U.S. Application Data

(60) Provisional application No. 61/286,229, filed on Dec. 14, 2009.

(51) Int. Cl.
*F21V 9/00* (2006.01)
*C01G 23/00* (2006.01)

(52) U.S. Cl.
USPC ............................ 252/582; 423/598; 977/896

(58) Field of Classification Search
USPC ............................ 252/582; 977/896; 423/598
See application file for complete search history.

(56) References Cited

FOREIGN PATENT DOCUMENTS

CN         101279767    * 10/2008

OTHER PUBLICATIONS

Zhou et al., Preparation and Characteristic of Polycrystalline Bismuth Titanante B12TiO20 and its photocatalytic properties under visible light irradiation, Ind. Fng. Chem. Res. 2007, 46, 745-749.*
Melillo et al., Global climate change and terrestrial net primary production, Nature, May 20, 1993, pp. 234-240, vol. 363.
Weiss et al., Non-energy use of fossil fuels and resulting carbon dioxide emissions: bottom-up estimates for the world as a whole and for major developing countries, Climatic Change, Apr. 15, 2009, pp. 369-394, vol. 95.
Smith et al., Chapter 9. Photo-electrochemical and Photo-catalytic Conversion of Carbon Dioxide, Photo-Electrochemistry & Photo-Biology for the Sustainability, 2010, pp. 217-242, vol. 1.
Anpo et al., Photocatalytic reduction of CO2 with H2O on various titanium oxide catalysts, Journal of Electroanalytical Chemistry, 1995, pp. 21-26, vol. 396.
Hinogami et al., An Approach to Ideal Smiconductor Electrodes for Efficient Photoelectrochemical Reduction of Carbon Dixoide by Modification with Small Metal Particles, Journal of Physical Chemistry B, 1998, pp. 974-980, vol. 102, No. 6.
Matsumoto et al., Photocatalytic Reduction of Carbon Dioxide on p-Type CaFe2O4 Powder, The Journal of Physical Chemistry, 1994, pp. 2950-2951, vol. 98, No. 11.
Wang et al., Visible Light Photoreduction of CO2 Using CdSe/Pt/TiO2 Heterostructured Catalysts, The Journal of Physical Chemistry Letters, 2010, pp. 48-53, vol. 1.
Koci et al., Effect of TiO2 particle size on the photocatalytic reduction of CO2, Applied Catalysis B: Environmental, 2009, pp. 494-502, vol. 89.
Xie et al., Application of surface photovoltage technique in photocatalysis studies on modified TiO2 photo-catalysts for photoreduction of CO2, Materials Chemistry and Physics, 2001, pp. 103-106, vol. 70.
Tseng et al., Effects of sol-gel procedures on the photocatalysis of Cu/TiO2 in CO2 photoreduction, Journal of Catalysis, 2004, pp. 432-440, vol. 221.
Wu et al., Shape-Enhanced Photocatalytic Activity of Single-Crystalline Anatase TiO2 (101) Nanobelts, Journal of American Chemical Society, Apr. 26, 2010, pp. 6679-6685, vol. 132.
Murugesan et al., Hydrothermal Synthesis of Bi12TiO20 Nanostructures Using Anodized TiO2 Nanotubes and Its Application in Photovoltaics, The Journal of Chemistry Letters, 2010, pp. 1631-1636, vol. 1.
Sohn et al., Electrochemically assisted photocatalytic degradation of methyl orange using anodized titanium dioxide nanotubes, 2008, pp. 372-378, vol. 84.
Sanchez-Sanchez et al., Electrochemical approaches to alleviation of the problem of carbon dioxide accumulation, Pure and Applied Chemistry, 2001, pp. 1917-1927, vol. 73, No. 12.
Holt-Hindle et al., Electrocatalytic Activity of Nanoporous Pt-Ir Materials toward Methanol Oxidation and Oxygen Reduction, Journal of the Electrochemical Society, 2008, pp. K5-59, vol. 155, No. 1.
Lovic et al., Kinetic study of formic acid oxidation on carbon-supported platinum electrocatalyst, Journal of Electroanalytical Chemistry, 2005, pp. 294-302, vol. 581.

(Continued)

*Primary Examiner* — Ling Choi
*Assistant Examiner* — Monique Peets
(74) *Attorney, Agent, or Firm* — Wood, Herron & Evans, LLP

(57) ABSTRACT

The present invention relates to formation of nanocubes of sillenite type compounds, such as bismuth titanate, i.e., $Bi_{12}TiO_{20}$, nanocubes, via a hydrothermal synthesis process, with the resulting compound(s) having multifunctional properties such as being useful in solar energy conversion, environmental remediation, and/or energy storage, for example. In one embodiment, a hydrothermal method is disclosed that transforms nanoparticles of $TiO_2$ to bismuth titanate, i.e., $Bi_{12}TiO_{20}$, nanocubes, optionally loaded with palladium nanoparticles. The method includes reacting titanium dioxide nanotubes with a bismuth salt in an acidic bath at a temperature sufficient and for a time sufficient to form bismuth titanate crystals, which are subsequently annealed to form bismuth titanate nanocubes. After annealing, the bismuth titanate nanocubes may be optionally loaded with nano-sized metal particles, e.g., nanosized palladium particles.

18 Claims, 4 Drawing Sheets

(56) References Cited

OTHER PUBLICATIONS

Kang et al., Influence of Bi Modification of Pt Anode Catalyst in Direct Formic Acid Fuel Cells, Journal of Physical Chemistry B, 2006, pp. 7270-7274, vol. 110.

Indrakanti et al., Quantum Mechanical Modeling of CO2 Interactions with Irradiated Stoichiometric and Oxygen-Deficient Antase TiO2 Surfaces: Implications for the Photocatalytic Reduction of CO2, Energy & Fuels, Aug. 28, 2008, pp. 5247-5256, vol. 23.

Raja et al., Formation of self-ordered nano-tubular structure of anodic oxide layer on titanium, Electrochimica Acta, 2005, pp. 154-165, vol. 51.

Rice et al., Direct formic acid fuel cells, Journal of Power Sources, 2002, pp. 83-89, vol. 111.

Yao et al., Photocatalytic property of bismuth titanate Bi12TiO20 crystals, Applied Catalysis A: General, 2003, pp. 185-190, vol. 243.

Xie et al., Isopropanol-assisted hydrothermal synthesis of bismuth titanate nanophotocatalysts, Materials Letters, 2006, pp. 284-286, vol. 60.

Xu et al., Photocatalytic properties of bismuth titanate Bi12TiO20 prepared by co-precipitation processing, Materials Science and Engineering B, 2007, pp. 108-111, vol. 137.

Chanmanee et al., Formation and Characterization of Self-Organized TiO2 Nanotube Arrays by Pulse Anodization, Journal of American Chemical Society, 2008, pp. 965-974, vol. 130.

Kar et al., Improved Photocatalytic Degradation of Textile Dye Using Titanium Dioxide Nanotubes Formed Over Titanium Wires, Environmental Science and Technology, 2009, pp. 3260-3265, vol. 43, No. 9.

Ruan et al., Fabrication of Highly Ordered TiO2 Nanotube Arrays Using an Organic Electrolyte, Journal of Physical Chemistry B, 2005, pp. 15754-15759, vol. 109, No. 33.

Zhou et al., Preparation and Characterization of Polycrystalline Bismuth Titanate Bi12TiO20 and Its Photocatalytic Properties under Visibile Light Irradiation, Industrial & Engineering Chemistry Research, 2007, pp. 745-749, vol. 46, No. 3.

\* cited by examiner

HYDROTHERMAL SYNTHESIS OF NANOCUBES OF SILLENITE TYPE COMPOUNDS FOR PHOTOVOLTAIC APPLICATIONS AND SOLAR ENERGY CONVERSION OF CARBON DIOXIDE TO FUELS

CROSS REFERENCE TO RELATED APPLICATIONS

This application claims the benefit of U.S. Provisional Application No. 61/286,229, filed Dec. 14, 2009, the disclosure of which is hereby incorporated by reference herein in its entirety.

GOVERNMENT LICENSE RIGHTS

This invention was made with government support under Grant Number DE-EE0000272, awarded by the U.S. Department of Energy; the United States federal government, therefore, has certain rights in the invention.

TECHNICAL FIELD

The present invention relates to formation of nanostructures of sillenite type compounds, such as bismuth titanate, i.e., $Bi_{12}TiO_{20}$, nanocubes, via a hydrothermal synthesis process, with the resulting compounds being useful in photovoltaic applications and solar energy conversion for fuel production, for example.

BACKGROUND

Sillenite type compounds (I23 space group) of the general formula (I) $A_{12}RO_{20}$ where A can be bismuth (Bi); R can be lead (Pb), nickel (Ni), aluminum (Al), titanium (Ti), iron (Fe), silicon (Si), barium (Ba), manganese (Mn), zinc (Zn), cadmium (Cd), calcium (Ca), copper (Cu), gallium (Ga), or vanadium (V), or fractions between 0 and 1 of one or more thereof; and O is oxygen, have attracted much interest in solar energy conversion to electricity (photovoltaic application) and conversion of carbon dioxide ($CO_2$) to fuels due to their light absorption capabilities and unique non-centrosymmetry crystal structure (B. Mihailova et al., J. Phys. Chem. Solids, 60, 1829, (1999); W. Yao et al., Appl. Catal. A 243, 185, (2003); J. Zhou et al., Ind. Eng. Chem. Res. 46, 745 (2007); Journal of Molecular Catalysis, 202, 305-311 (2003), with each article herein being expressly incorporated by reference herein in its entirety). Among the sillenite type compounds, bismuth titanate, i.e., $Bi_{12}TiO_{20}$, also referred to herein as BTO, receives considerable attention for photovoltaic uses because of its high refractive index and electro optic coefficient. Other contemplated uses are photocatalysis application, for example. The $Bi_{12}TiO_{20}$ crystal is formed by the seven-oxygen coordinated bismuth polyhedra, which is corner shared by other identical bismuth polyhedra and with $TiO_4$ tetrahedra. An enhanced light absorption activity can be attributed to the contribution of 6s electrons of bismuth in the valence band along with O 2p orbitals.

Various methods have been used to prepare bismuth titanate compounds having the resulting $Bi_{12}TiO_{20}$ sillenite type structure. Such methods include self flux, chemical solution decomposition (CSD), isopropanol-assisted hydrothermal synthesis, co-precipitation methods, and hydrothermal process in potassium hydroxide (KOH) medium using titanium and bismuth sol-gel precursors. In one example, a non-photoactive compound, such as $SiO_2$, can be transformed to a photoactive material having a sillenite type structure using bismuth to form, e.g., $Bi_{12}SiO_{20}$ (T. Toyoda et al., J Phys D Appl Phys., 19, 909, (1986)). However, the preparation techniques for the aforementioned methods are known to involve multiple steps, high temperatures, and/or complex synthesis procedures. Further, coating the synthesized materials over a suitable conducting substrate can also unfavorably reduce photocatalytic activity.

Also extensively studied and used as photocatalysts to harvest solar energy are nanoparticles of titanium dioxide ($TiO_2$). $TiO_2$ nanoparticles have shown very good stability over a wide pH range and are compatible with other materials, environmentally friendly, inexpensive, and non-toxic. However, interfacial grain boundaries in films prepared from $TiO_2$ nanoparticles have been known to contribute to reducing charge transport by functioning as recombination centers. Recently, the synthesis of $TiO_2$ specifically in the form of hollow nanotubes by anodization of a titanium foil has been demonstrated (D. Gong et al., J. Mater. Res. 16, 3331, (2001)). Such nanotubes are generally produced by anodic oxidation in various electrolytes. Notably, the absence of grain boundaries in the resulting nanotubes favors efficient transport of photogenerated electrons. And since the $TiO_2$ nanotubes are electrically well connected and anchored firmly on an underlying titanium substrate as a raw material for preparing sillenite type compounds, the material is desirable in energy conversion (photovoltaics), environmental remediation (photodegradation), or solar fuel production ($CO_2$ conversion to value added hydrocarbon chemicals such as alcohols, acids, and ethers), for example.

Based on the foregoing, it would be beneficial to provide a simple synthesis process for preparing nanostructures of sillenite type compounds, including $Bi_{12}TiO_{20}$ nanotubes, from corresponding oxides, e.g., $TiO_2$, which overcomes the aforementioned drawbacks, with the resulting compounds being desirable for use in photovoltaic applications and for solar energy conversion $CO_2$ to fuels, for example.

SUMMARY

In one embodiment, a method of making a bismuth titanate nanocube is provided, which includes reacting titanium dioxide nanotubes with a bismuth salt in an acidic bath at a temperature sufficient and for a time sufficient to form bismuth titanate crystals having the formula $Bi_{12}TiO_{20}$, where Bi is bismuth; Ti is titanium or a fraction thereof between 0 and 1; and O is oxygen. Then the bismuth titanate crystals are annealed to form bismuth titanate nanocubes. After annealing, the bismuth titanate nanocubes may be optionally loaded with nano-sized metal particles, e.g., nano-sized palladium particles.

In another embodiment, a method of making bismuth titanate nanocubes is provided, which includes mixing titanium dioxide nanotubes and a bismuth salt in an acidic bath having a pH of 0 to 1, and reacting the titanium dioxide nanotubes and the bismuth salt in the acidic bath at a temperature from about 110° C. to about 175° C. and for a time sufficient to form bismuth titanate crystals having the formula $Bi_{12}TiO_{20}$, where Bi is bismuth; Ti is titanium or a fraction thereof between 0 and 1; and O is oxygen. After which, the bismuth titanate crystals are annealed at a temperature sufficient and for a time sufficient to form bismuth titanate nanocubes. After annealing, the bismuth titanate nanocubes may be optionally loaded with nano-sized metal particles, e.g., nanosized palladium particles.

In another embodiment, a hydrothermal synthesis method of making a nanocube of a sillenite type compound of the general formula (I) $A_{12}RO_{20}$ is provided, where A can be bismuth (Bi), strontium (Sr), tin (Sn), nickel (Ni), aluminum (Al), titanium (Ti), iron (Fe), silicon (Si), barium (Ba), manganese (Mn), zinc (Zn), cadmium (Cd), calcium (Ca), copper (Cu), cobalt (Co), vanadium (V), gallium (Ga), yttrium (Y), lanthanum (La), cerium (Ce), hafnium (Hf), niobium (Nb), europium (Eu), samarium (Sm), or gadolinium (Gd), or fractions between 0 and 1 of one or more thereof; R can be lead (Pb), nickel (Ni), aluminum (Al), titanium (Ti), iron (Fe), silicon (Si), barium (Ba), manganese (Mn), zinc (Zn), cadmium (Cd), calcium (Ca), copper (Cu), gallium (Ga), or vanadium (V), or fractions between 0 and 1 of one or more thereof; and O is oxygen, The process includes reacting oxide nanotubes, e.g., titanium dioxide nanotubes, with a corresponding salt in an acidic bath at a temperature sufficient and for a time sufficient to form crystals having the formula $A_{12}RO_{20}$. Then the crystals are annealed to form nanocubes. After annealing, the nanocubes may be optionally loaded with nano-sized metal particles, e.g., nanosized palladium particles. In one example, the palladium may be replaced or combined with one or more other suitable elements, such as molybdenum (Mo), copper (Cu), iron (Fe), nickel (Ni), cobalt (Co), gold (Au), or rhodium (Rh).

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
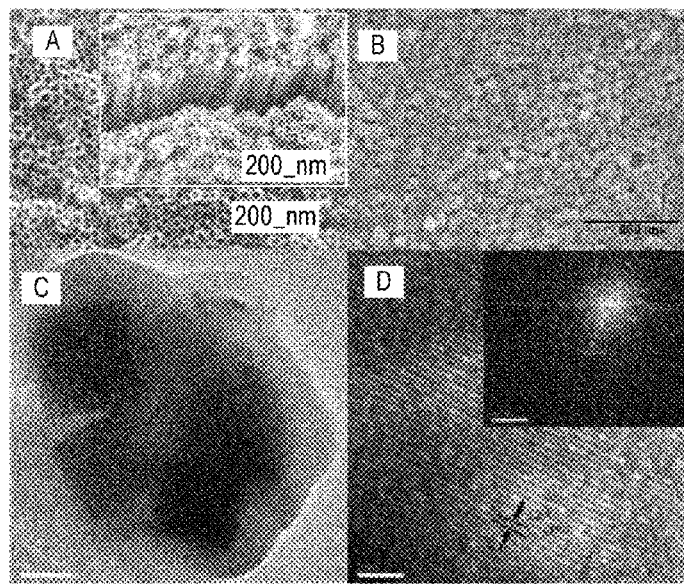
FIGS. 1A-D are high resolution images of (A) $TiO_2$ nanotubes and (B)-(D) the resulting $Bi_{12}TiO_{20}$ nanocubes prepared in accordance with the hydrothermal methods of the present invention.

In accordance with embodiments of the present invention, a hydrothermal method is disclosed that transforms oxide nanotubes, e.g., $TiO_2$ nanotubes, also referred to herein as TNTs, at a nanotube-hydrothermal mixture interface to ultimately nanocubes of a sillenite type compound of the general formula (I) $A_{12}RO_{20}$ where A can be bismuth (Bi), strontium (Sr), tin (Sn), nickel (Ni), aluminum (Al), titanium (Ti), iron (Fe), silicon (Si), barium (Ba), manganese (Mn), zinc (Zn), cadmium (Cd), calcium (Ca), copper (Cu), cobalt (Co), vanadium (V), gallium (Ga), yttrium (Y), lanthanum (La), cerium (Ce), hafnium (Hf), niobium (Nb), europium (Eu), samarium (Sm), or gadolinium (Gd), or fractions between 0 and 1 of one or more thereof; R can be lead (Pb), nickel (Ni), aluminum (Al), titanium (Ti), iron (Fe), silicon (Si), barium (Ba), manganese (Mn), zinc (Zn), cadmium (Cd), calcium (Ca), copper (Cu), gallium (Ga), or vanadium (V), or fractions between 0 and 1 of one or more thereof; and O is oxygen, and, in one example, to bismuth titanate, i.e., $Bi_{12}TiO_{20}$, nanocubes, also referred to herein as BTO nanocubes. In another example, Bi is bismuth; R is titanium (Ti) or a fraction thereof between 0 and 1, optionally in combination with other elements at the R site; and O is oxygen.

The $TiO_2$ nanotubes may be prepared by anodization of Ti foils, as per the procedure disclosed in Y. S. Sohn et al., Appl. Catal. B, 84, 372 (2008), which is incorporated by reference herein in its entirety and discussed further below. The resulting BTO nanocubes may be characterized by various spectroscopic techniques and its photoactivity compared to that of the TNTs. The hydrothermal methods herein generally may be used in development of photochromic materials, optical waveguides, high temperature catalyst supports, ionic conductors (such as fuel cells), and energy storage (such as batteries), for example.

Chemicals/Materilas Used

Ammonium fluoride ($NH_4F$, Fischer, 100%), ethylene glycol ($C_2H_4(OH)_2$, Fischer), deionized water (Millipore Q®), acetone ($C_3H_6O$, Sigma Aldrich, 99.5%, diluted to 50%), methyl orange (Sigma Aldrich), bismuth chloride ($BiCl_3$, Sigma Aldrich, reagent grade), hydrochloric acid (HCl, VWR, 36.5% assay), potassium hydroxide (KOH, Fischer), and titanium foil of thickness 0.2 mm (ESPI Metals 99.9% purity) were received and used without any further treatment.

Preparation of $TiO_2$ Nanotubes $TiO_2$ nanotubes (TNTs) may be initially prepared from 2±1.5 cm×4±2 cm strips of titanium foil. Specifically a 1×4 cm titanium foil was used as an illustration of the method. In another example, the $TiO_2$ nanotubes (TNTs) may be initially formed on substrates having different geometries, such as on a titanium wire or mesh or on conducting glass, e.g., indium-doped tin oxides. 3 cm of each foil is immersed in an anodization solution containing an ethylene glycol solution with 0.5 wt % ammonium fluoride and 10 wt % distilled water. Before anodization, the titanium foils are washed in acetone under ultrasonication for five minutes. Formation of $TiO_2$ nanotubular arrays, i.e., oxidation of the titanium foils, may be achieved by anodization thereof at 20 $V_{DC}$ bias (Agilent E3649A DC Power Source) for 60 minutes, with continuous agitation. A two-electrode system can be used for anodization with a flag platinum cathode of 3.75 $cm^2$ and a distance of 4.5 cm is maintained for all experiments. Agitation of the anodization bath can be carried out through ultrasonication at 42 kHz (Branson 3510 Ultrasonicator). After anodization, all samples can be washed with deionized water to remove any occluded ions and allowed to dry. Next, annealing of the anodized samples can take place in a tube furnace (Thermo Scientific, Lindberg Blue M BF51866C) with nitrogen atmosphere at 500° C. for 2 hours. The furnace may be ramped at a rate of 1° C./minute with continuous gas flow. The resulting foils yield a close array of $TiO_2$ tubular-shaped crystal structures, i.e., $TiO_2$ nanotubes (TNTs), which are generally perpendicularly aligned lengthwise, with length and width dimensions for the TNTs detectable on the nano measurement scale using known microscopy techniques. Other types of oxide nanotubes may be similarly prepared.

Hydrothermal Synthesis

The as-prepared oxide nanotubes, e.g., TNTs, next are subjected to hydrothermal treatment, which entails placement of the foils in a stainless steel reactor with Teflon® lining. For bismuth titanate nanocube formation, the reactor includes 100 ml of an acidic bath, e.g., 1 M HCl bath, which contains a bismuth salt, e.g., 3.15 g bismuth chloride ($BiCl_3$), to give an overall concentration of a 0.1 M $BiCl_3$ salt solution in 1 M HCl and a pH of 0 to 1. The HCl bath is at a temperature sufficient, e.g., about 120-125° C., for reaction to occur between the bismuth salt and TNT. The foils remain in the bath for about 24 to 48 hours under a pressure of about 5 bar. The overall salt concentration of the HCl bath can be from about 0.1 M to 3 M $BiCl_3$ salt. In another embodiment, the overall salt concentration can be from about 0.1 M to 1 M $BiCl_3$ salt. As best understood, during hydrothermal treatment, some of the $TiO_2$ reacts with the bismuth salt to form Bi—Ti—O bonds, as understood from preliminary X-ray photoelectron spectroscopyanalysis (XPS). The reactions cause nucleation of the BTO, i.e., seed formation, on the undissolved $TiO_2$ surface with growth of the BTO subsequently induced by the seed particles. During this growth process, the shape and orientation of the BTO is initiated and begins to take form, which ultimately results in a close array of BTO crystals that are generally perpendicularly aligned lengthwise and which define elongated cube-like structures. As with the TNTs, length and width dimensions for the BTO nanotubes are detectable on the nano measurement scale using known microscopy techniques, as further discussed below.

After hydrothermal treatment, all samples are cooled to room temperature, rinsed with deionized water, and allowed to dry over night. Next, annealing of the BTO structure can take place in a tube furnace (Thermo Scientific, Lindberg Blue M BF51866C) with nitrogen atmosphere at 500° C. for 2 hours. The furnace can be ramped at a rate of 1° C./minute with continuous gas flow. After which time, full transformation of the $TiO_2$ nanotubes to $Bi_{12}TiO_{20}$ nanocubes is complete at the surface of the titanium foils, as can be determined via surface analysis techniques. These nanotubes may be used in photovoltaic or photocatalysis applications. This method also may be used to prepare other titanium based compounds that may have applications as above listed. The resulting $Bi_{12}TiO_{20}$ nanocubes generally define an elongated length of about 200 nm to about 1 micron. In one example, the length is about 90 nm And the generally equal sides of the $Bi_{12}TiO_{20}$ nanocubes give a width of about 90 nm.

It should be understood that the process parameters for the hydrothermal synthesis, as discussed above, can be varied, yet, still provide desirable nanocubes of the sillenite type compounds of the general formula (I), including $Bi_{12}TiO_{20}$ nanocubes, for the desired photovoltaic or photocatalysis applications. For example, the hydrothermal treatment temperature may be as low as about 110° C. and as high as about 175° C. In addition, the duration of the hydrothermal treatment may last up to 72 hours. Concerning the bath, hydrochloric acid (HCl) may be replaced with any suitable acid substitute, such as nitric acid, acetic acid, sulfurous acid ($H_2SO_3$), formic acid (HCOOH), or perchloric acid ($HClO_4$). The pH of the bath may range from 0 to 2. And other bismuth salts may be utilized in place of the $BiCl_3$ salt including bismuth nitrate, bismuth fluoride, bismuth iodide, or bismuth oxychloride, for example. In addition, it should be further understood that the process parameters for annealing of the BTO as well as formation of the TNTs also may be varied, yet, still provide desirable $Bi_{12}TiO_{20}$ nanocubes and desirable starting material for the formation of the resulting $Bi_{12}TiO_{20}$ nanocubes. For example, with respect to annealing of the BTO, the nitrogen may be replaced with any suitable inert gas, the annealing temperature can range from about 100° C. to about 500° C., the length of time can range from about 10 minutes to 24 hours (or from about 1 hour to 6 hours), and the furnace can be ramped at a rate of from about 1° C./minute to about 20° C./minute with continuous gas flow.

The resulting nanocubes, e.g., $Bi_{12}TiO_{20}$ nanocubes, may be further optionally loaded with nano-sized palladium (Pd) particles. Particles sizes can range from about 10 nm to about 50 nm. In another example, the palladium nanoparticle sizes can range from about 10 to about 20 nm. The palladium nanoparticles can be deposited on the BTO surface with an ultrasound-assisted incipient wetness technique using a Pd-salt solution.

In one example, the resulting nanocubes, e.g., $Bi_{12}TiO_{20}$ nanocubes, can be immersed in a palladium salt solution, e.g., 0.5 wt % $PdCl_2$ containing alcoholic (ethanolic) solution, for a time sufficient, e.g., 30 minutes, under ultrasonication using a 42 kHz Branson 3510 Ultrasonicator. Other suitable palladium salts can include, for example, palladium (II) acetate, palladium (II) acetylacetonate, palladium (II) nitrate, palladium (II) oxide, palladium (II) sulfate, palladium (II) sulfide, palladium (II) trifluoroacetate, ammonium hexachloropalladate (IV), bis(acetonitrile) dichloropalladium (II), potassium hexachloropalladate (IV), and bis(triphenylphosphine) palladium (II) dichloride. The palladium also may be replaced or combined with one or more other suitable elements, such as molybdenum (Mo), copper (Cu), iron (Fe), nickel (Ni), cobalt (Co), gold (Au), or rhodium (Rh). In one example, the BTO nanocube includes at least two different metal elements, such as to provide a bimetallic complex, which can improve activity towards $CO_2$ photocatalytic reduction. Other suitable solvents can include, for example, acetone, dichloromethane, chloroform, dimethylforamide, dimethylsulfoxide, toluene and diethylether. Also, the length of ultrasonication can vary. For example, the ultrasonication can last from about 10 minute to about 3 hours (under controlled temperature).

The Pd containing solution is understood to wet the internal and external surfaces of the BTO nanocubes almost thoroughly, at least in part, because of the ultrasonication. The Pd salt loaded nanotube then may be vacuum dried to remove ethanol. After which time, the samples can be annealed, for example, at 500° C. for 2 h in a reducing atmosphere containing 10% hydrogen in argon so as to reduce the Pd (II) to metallic Pd resulting in a palladium loaded BTO nanocube, which can be suitable for use in solar energy conversion of $CO_2$ to fuels. With respect to annealing, the 10% hydrogen in argon atmosphere may be replaced with forming gas (10% $H_2$ and 90% $N_2$), the annealing temperature can range from about 200° C. to about 500° C., and the length of time can range from about 30 minutes to about 15 hours.

While discussion has revolved around the preparation of $Bi_{12}TiO_{20}$ nanocubes, nanocubes of the sillenite type compounds of the general formula (I) $A_{12}RO_{20}$, where A can be bismuth (Bi), strontium (Sr), tin (Sn), nickel (Ni), aluminum (Al), titanium (Ti), iron (Fe), silicon (Si), barium (Ba), manganese (Mn), zinc (Zn), cadmium (Cd), calcium (Ca), copper (Cu), cobalt (Co), vanadium (V), gallium (Ga), yittrium (Y), lanthanum (La), cerium (Ce), hafnium (Hf), niobium (Nb), europium (Eu), samarium (Sm), or gadolinium (Gd), or fractions between 0 and 1 of one or more thereof; R can be titanium (Ti) as well as lead (Pb), nickel (Ni), aluminum (Al), titanium (Ti), iron (Fe), silicon (Si), barium (B a), manganese (Mn), zinc (Zn), cadmium (Cd), calcium (Ca), copper (Cu), gallium (Ga), or vanadium (V), or fractions between 0 and 1 of one or more thereof; and O is oxygen, can be formed utilizing similar techniques in step with the hydrothermal treatments disclosed hereinabove. Indeed, such compounds as $Bi_{12}SiO_{20}$, etc. may be formed from $SiO_2$, and other corresponding oxides, for example, via the hydrothermal methods.

Characterization

A field emission-scanning electron microscope (FESEM, Hitachi, S-4700) with an accelerating voltage of 20 kV was used to analyze the morphology of BTO nanotubes prepared in accordance with the above disclosed hydrothermal synthesis process using the as-prepared TNTs. And high resolution transmission electron microscopic studies (High-resolution transmission electron microscopy (HRTEM), JEOL 2100F) with selected area electron diffraction (SAED) and Fast Fourier Transformation (FFT) were also performed at 200 kV to determine/verify the morphology and the crystal phase. The resulting products were identified as BTO nanocubes.

With specific reference now to FIGS. 1A-D, these figure show, respectively, (A) a scanning electron microscope (SEM) image of the $TiO_2$ nanotubes prepared by anodization of the titanium foil, (B) an SEM image of $Bi_{12}TiO_{20}$ nanocubes formed over the $TiO_2$ nanotubes after the hydrothermal treatment, (C) a HRTEM image of the resulting $Bi_{12}TiO_{20}$ nanocubes, and (D) a FFT image of the $Bi_{12}TiO_{20}$ nanocube with growth along the (310) (hkl) plane (JCPDS#34-0097), which is supported by SAED (inset of D). Surface analysis identifies the resulting sillenite type material as nanocubes of $Bi_{12}TiO_{20}$.

Figure 2:
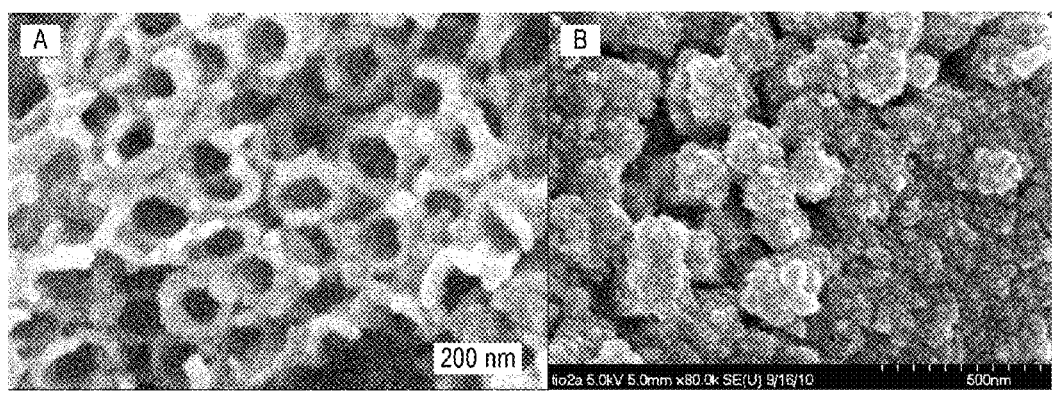
FIGS. 2A and 2B are high resolution images of (A) palladium (Pd) loaded $TiO_2$ nanotubes (TNT) and (B) palladium (Pd) loaded BTO nanocubes, as prepared in accordance with the hydrothermal methods of the present invention.

With reference to FIGS. 2A and 2B, these figures show, respectively, a scanning electron microscope (SEM) image of palladium loaded $TiO_2$ nanotubes formed in accordance with the palladium loading process discussed above for the BTO nanocubes and (B) an SEM image of palladium loaded BTO nanocubes formed over the $TiO_2$ nanotubes after the hydrothermal treatment and subsequent palladium loading process. In FIG. 2A, the rims of the TNT nanotubes are almost continuously coated with Pd nanoparticles. The energy dispersive X-ray analysis spectrum of the Pd loaded TNT indicated a Pd peak (about 1 wt % Pd) confirming the presence of Pd deposits. The size of Pd particles was in the range of 10-20 nm Treatment of the BTO with the $PdCl_3$ salt solution resulted in the formation of a deposit of Pd nanoparticles, with sizes ranging from about 10-20 nm and a few agglomerated Pd areas of about 50 nm in size being observed in a few locations.

Photochemical Measurements

Photoelectrochemical experiments were carried out in a quartz optical cell. TNT and BTO nanocube samples prepared in accordance with the above disclosed synthesis methods (without palladium loading) were used as the photoanode, while a platinum flag or wire was used as the cathode. A silver/silver chloride (Ag/AgCl) was used as the reference electrode for all experiments (unless otherwise specified). Only 2.5 cm of each foil strip was submerged in a 0.1 M to 1 M KOH electrolyte solution. A potentiostat (Autolab PGSTAT 302) was used to control external bias and monitor the photocurrent. All samples were polarized at a scan rate of 10 mV/s under illumination. A solar simulator, about 90 mW $cm^{-2}$, (Newport 66902, Oriel Research) was used as the light source with a 0.5 M copper sulfate solution used to filter far UV radiation. To determine visible light activity, a visible band pass filter 405 nm (Newport 1079875) was used. Test results show an instantaneous response upon UV-vis illumination for the BTO nanocubes, with about a 35% increase in photocurrent as compared to the $TiO_2$ nanotubes.

Figure 3:
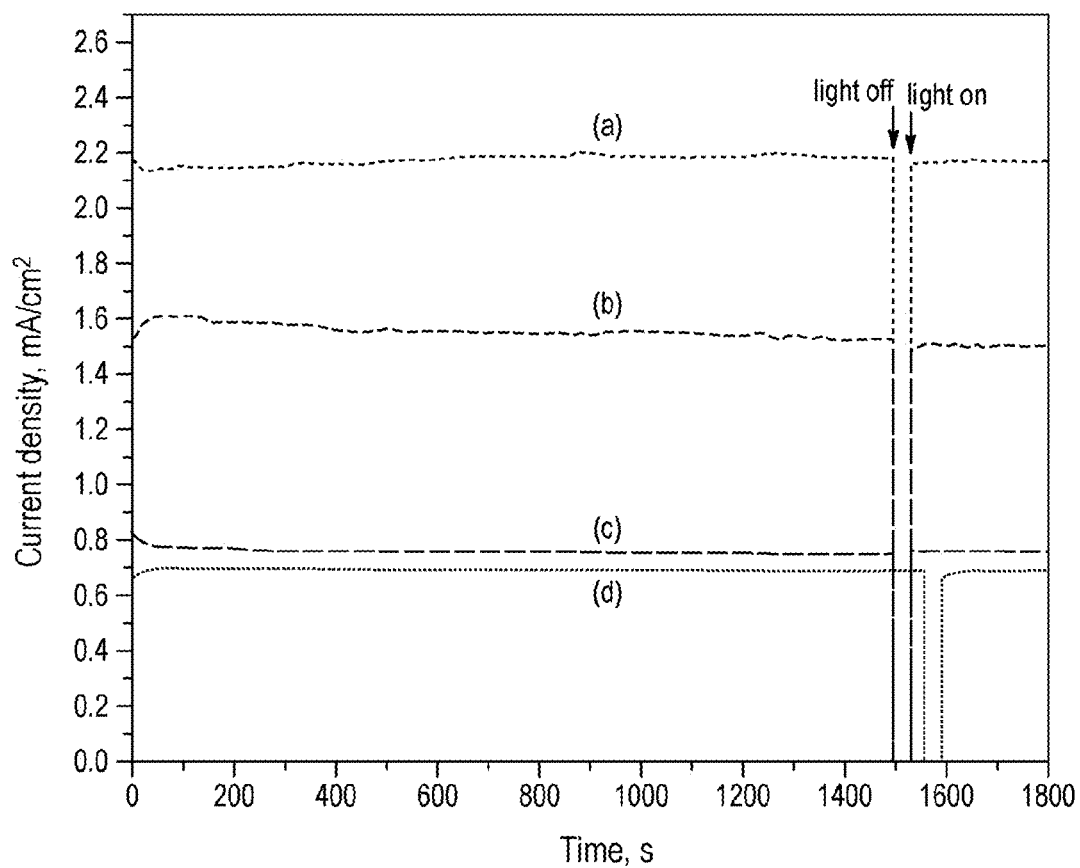
FIG. 3 is a chronoamperometry plot demonstrating that the resulting $Bi_{12}TiO_{20}$ nanocubes have a stable photocurrent under visible and UV-vis illumination when prepared in accordance with the hydrothermal methods of the present invention.

With reference now to FIG. 3, this figure shows the on-off cycles of photocurrent responses under UV-Vis illumination at zero bias with respect to the reference electrode (a) $Bi_{12}TiO_{20}$ nanocubes, (b) $TiO_2$ nanotubes formed over Ti foil, (c) visible light response of $Bi_{12}TiO_{20}$ nanocubes, and (d) visible light response of $TiO_2$ nanotubes. Specifically, the chronoamperometry plots show that $Bi_{12}TiO_{20}$ nanocubes formed over Ti foil demonstrate a stable photocurrent under UV-vis illumination. And the magnitude of this current is 600 µA higher than the $TiO_2$ nanotubes. The $TiO_2$ nanotubes show visible light activity when prepared in ethylene glycol, which has been attributed to carbon doping (S. K. Mohapatra et al., J. Phys. Chem. C, 111, 8677 (2007)). In this context, it is noted that the BTO nanocubes formed by hydrothermal synthesis offer not only similar visible light activity as the $TiO_2$ nanotubes, but also demonstrate enhanced UV activity.

Figure 4A:
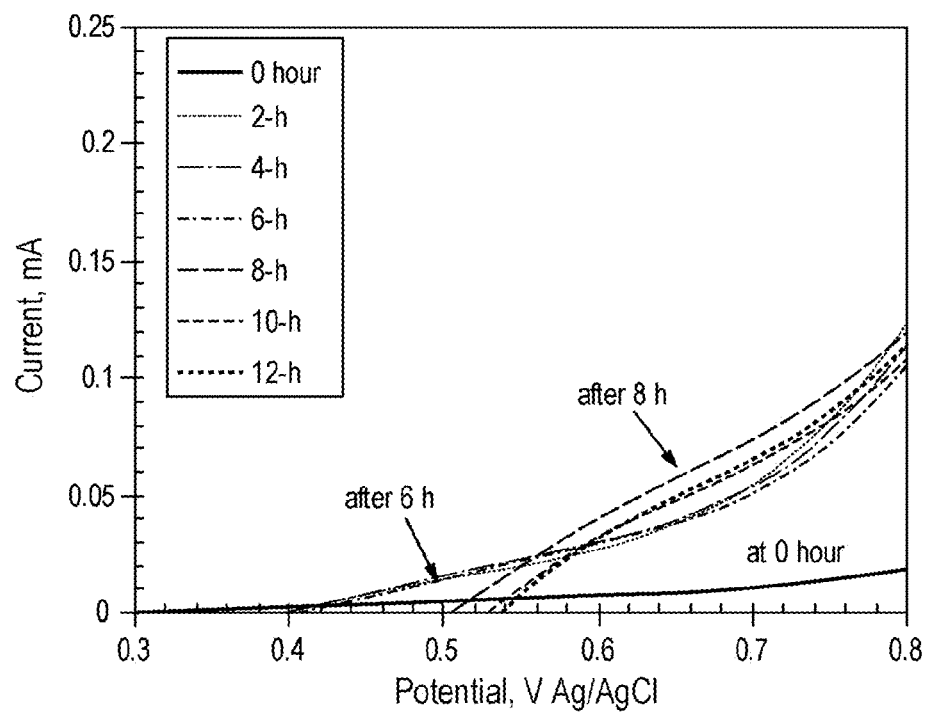
FIGS. 4A and 4B are graphs depicting photocatalytic reduction over time of, respectively, (A) Pd loaded TNT and (B) Pd loaded BTO nanocubes in a $CO_2$ saturated 0.1 M $H_2SO_4$, after illumination.
Figure 4B:
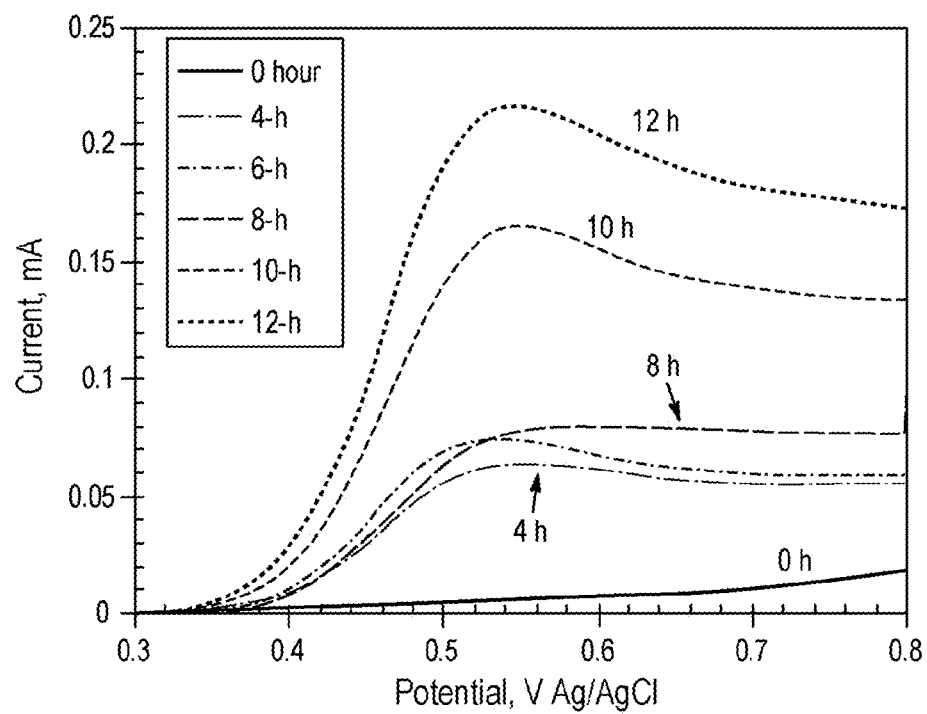

With reference now to FIGS. 4A and 4B, these figures show photocatalytic reduction of carbon dioxide ($CO_2$) over time of, respectively, (A) Pd loaded TNT and Pd loaded BTO nanocubes, prepared in accordance with the above disclosed synthesis methods with palladium loading, in a $CO_2$ saturated 0.1 M $H_2SO_4$, after illumination. Typically, reduction of $CO_2$ results in a spectrum of reaction products such as formic acid, formaldehyde, methanol, acetic acid and others. Since these reaction products show characteristic responses during electrochemical polarization, cyclic voltammetry (CV) can be considered as a simple and reliable tool to detect the products of $CO_2$ photoreduction. Therefore, the approach was to (i) generate a CV database of control samples in 0.1 M $H_2SO_4$ and (ii) compare the CVs obtained from the photoilluminated solution with the control solutions.

The CV of the $CO_2$-bubbled solution after photoillumination for different durations for palladium loaded TNTs was collected and compared to controls. The control experiments were performed by electrooxidation of formic acid with micro-millimolar concentrations (1 micoM to 1000 milliM) in 0.1 M $H_2SO_4$. The oxidation peak current density is plotted with concentration of formic acid. As shown in a representative FIG. 4A, an anodic wave with a shoulder at 0.56 V (vs. Ag/AgCl) was observed after 8 h of illumination. This anodic wave was attributed to the oxidation of formic acid after comparing with the controls.

An approach similar to the one used for Pd loaded TNTs was implemented for Pd loaded BTO nanocubes for analyzing the photoreduction products. FIG. 4B shows the forward scan part of the CV after different durations of photoillumination. Distinct oxidation waves were observed which were similar to the calibration CV plots of formic acid at low concentrations (<100 µmol/L). The CV results of Pd loaded BTO nanocube reduction products were marginally different from the results of Pd loaded TNT. In the case of Pd loaded BTO nanocubes, a decrease in current was observed after the initial anodic wave at potentials more positive than 0.54 V. On the other hand, the Pd loaded TNT reduction products showed initiation of a second anodic wave. The current continued to increase even at 0.8 V indicating oxidation of species other than formic acid.

The CV results indicate that the Pd loaded BTO nanocube photocatalysis resulted in formation of predominantly formic acid. In addition, the presence of formic acid in the photoreduced solution after 24 hours of illumination was further confirmed by carrying out high performance liquid chromatography. The overlapping of signals with similar retention times for the test liquid and the control confirmed the sample as formic acid. Control experiments were performed (i) in the absence of $CO_2$ bubbling and (ii) without illumination. The CV responses were featureless under both conditions indicating that the features in the CV are not from the catalyst and photoreduction product(s) formation occurs only in the presence of both $CO_2$ and light.

Figure 5A:
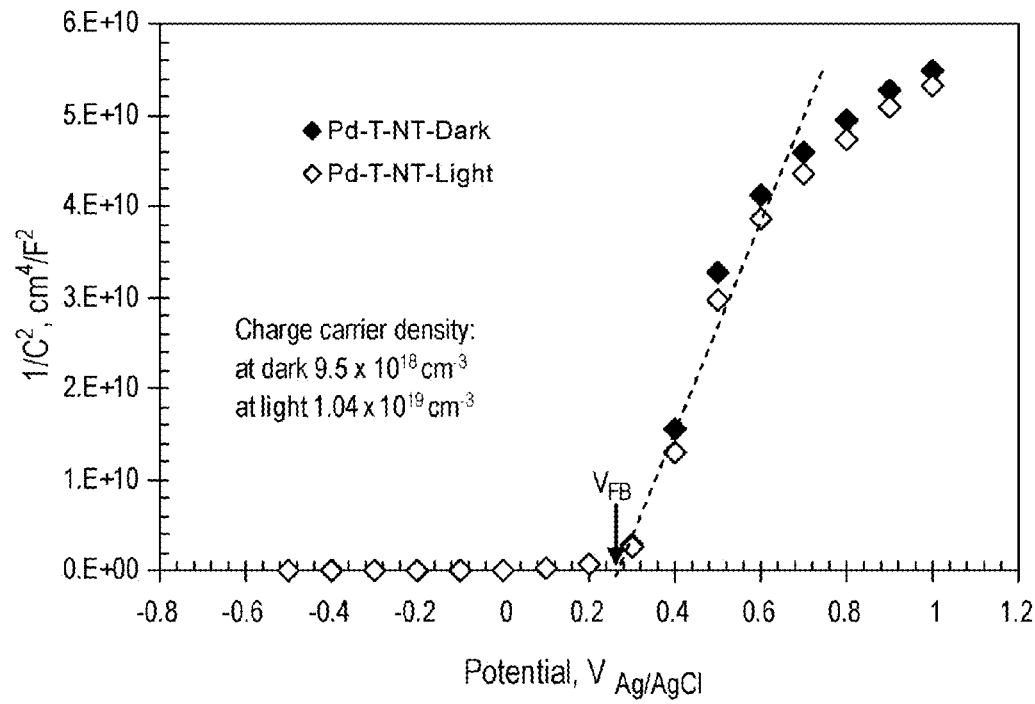
FIGS. 5A and 5B are Mott Schottky plots of (A) Pd loaded TNT and (B) Pd loaded BTO nanocubes, which was prepared in accordance with the hydrothermal methods of the present invention.
Figure 5B:
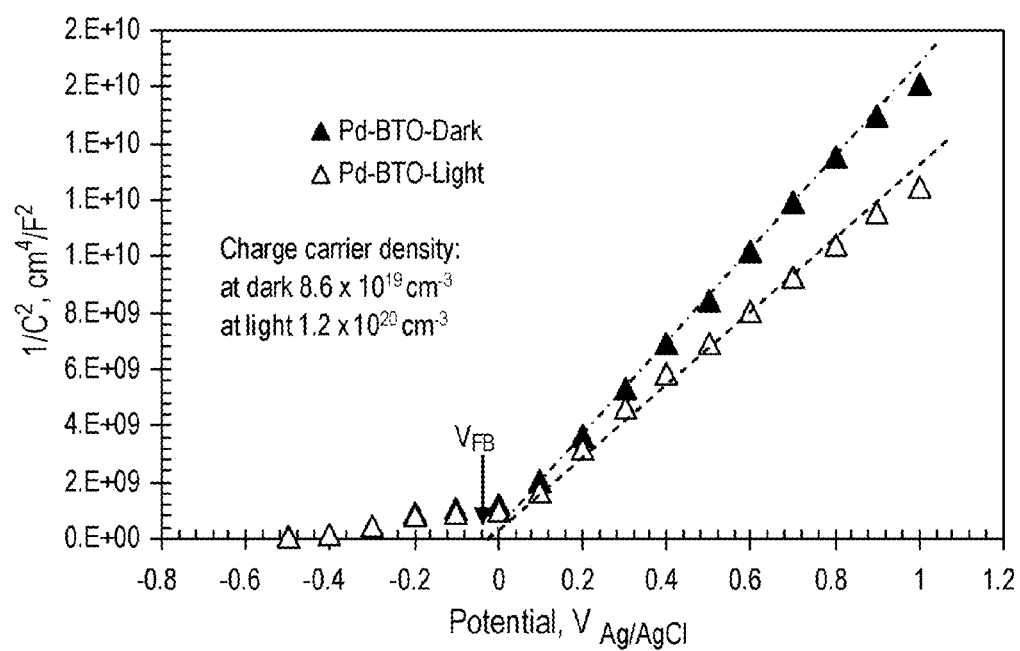

With reference now to FIGS. 5A and 5B, these figures show Mott Schottky plots of (A) the Pd loaded TNT and (B)

the Pd loaded BTO nanocubes and provide insight into the charge carrier densities and location of the apparent flat band potentials (Vfb) of the photocatalysts. The location of the $V_{fb}$ for Pd loaded TNT is observed at 0.28 V vs. Ag/AgCl while the $V_{fb}$ for Pd loaded BTO nanocubes is at −0.04 V vs. Ag/AgCl. This indicates a net shift of about 0.3 V in the $V_{fb}$ in the conduction band positions. An order of magnitude increase in the charge carrier density with Pd loaded BTO nanocubes compared to Pd loaded TNT is noted. Because the $V_{fb}$ for Pd loaded BTO nanocubes is more negative by about 0.3 V compared to Pd loaded TNT, higher band bending can occur in Pd loaded BTO nanocube facilitating improved photo effect with respect to the electrolyte reorganization energy. Thus, the shift in $V_{fb}$ and increase in charge carrier density, may be the reasons for the improved performance of BTO in the photoreduction of $CO_2$ to formic acid.

Accordingly, disclosed herein is a method for nanocube synthesis of sillenite type compounds of the general formula (I), including $Bi_{12}TiO_{20}$ nanocube synthesis and its photoelectrochemical properties. The resulting nanocubes, including $Bi_{12}TiO_{20}$ nanocubes, can be useful for solar energy conversion to electricity (photovoltaic devices) and $CO_2$ conversion to value added fuels, such as to harvest solar energy, as well as for photocatalysis applications, for example.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, the hydrothermal process can be used to prepare different crystal structure compounds by changing the concentration and the reactant composition. Further, by varying the reaction parameters such as temperature, pH, and solvents, one can utilize the hydrothermal method proposed herein to tune the synthesis of different compounds. By way of example, in general, it can be stated that: $A_1X$ ($A_1$ includes bismuth (Bi), strontium (Sr), tin (Sn), nickel (Ni), aluminum (Al), titanium (Ti), iron (Fe), silicon (Si), barium (Ba), manganese (Mn), zinc (Zn), cadmium (Cd), calcium (Ca), copper (Cu), cobalt (Co), vanadium (V), gallium (Ga), yittrium (Y), lanthanum (La), cerium (Ce), hafnium (Hf), niobium (Nb), europium (Eu), samarium (Sm), or gadolinium (Gd), or fractions between 0 and 1 of one or more thereof; and X is a precursor associated with the metal $A_1$, which can be an oxide, halide, and the like)+$A_2X'$ ($A_2$ includes bismuth (Bi), strontium (Sr), tin (Sn), nickel (Ni), aluminum (Al), titanium (Ti), iron (Fe), silicon (Si), barium (Ba), manganese (Mn), zinc (Zn), cadmium (Cd), calcium (Ca), copper (Cu), cobalt (Co), vanadium (V), gallium (Ga), yittrium (Y), lanthanum (La), cerium (Ce), hafnium (Hf), niobium (Nb), europium (Eu), samarium (Sm), or gadolinium (Gd), or fractions between 0 and 1 of one or more thereof; and X' is a precursor associated with the metal $A_2$, which can be an oxide, halide, and the like; and X and X' may be the same or different), can react under hydrothermal conditions to produce different crystal structure over pre-synthesized $TiO_2$ nanotubes, for example. The crystal structure of mixed metal oxides of $A_1 \times A_2(1-x)TiO_x$ can be obtained from hydrothermal synthesis through the dissolution of Ti and re-precipitation of the Ti along with other element(s) $A_1$, $A_2$, or $A_1A_2$ in different ratios. As examples of this generic reaction, mixed metal oxides of different crystal structures having the name pyrochlore ($A_2B_2O_7$), perovskite ($ABO_3$), Delafossites ($ABO_2$) and Spinels ($AB_2O_4$), and Meta materials can be synthesized over the pre-synthesized $TiO_2$ nanotubes by the present hydrothermal methods. Thus, the invention in its broader aspects is therefore not limited to the specific details, and method, and illustrative examples shown and described. Accordingly, departures may be made from such details without departing from the spirit or scope of applicant's general inventive concept.

What is claimed is:

1. A method of making bismuth titanate nanocubes comprising:
    reacting titanium dioxide nanotubes with a bismuth salt in an acidic bath at a temperature sufficient and for a time sufficient to form bismuth titanate crystals having the formula $Bi_{12}TiO_{20}$, where Bi is bismuth; Ti is titanium or a fraction thereof between 0 and 1; and O is oxygen; and
    annealing the bismuth titanate crystals to form bismuth titanate nanocubes,
    wherein the acidic bath has a bismuth salt concentration of from about 0.1M to 3M.

2. The method of claim 1 wherein the acidic bath has a pH of 0 to 2.

3. The method of claim 1 wherein the temperature sufficient is from about 110° C. to about 175° C.

4. The method of claim 1 wherein the time sufficient is from about 24 hours to about 72 hours.

5. The method of claim 1 wherein the bismuth titanate nanocubes define an elongated cube-like structure having a length of about 200 nm to about 1 micron.

6. The method of claim 1 further comprising, after annealing the bismuth titanate crystals to form bismuth titanate nanocubes, loading the bismuth titanate nanocubes with nano-sized metal particles.

7. The method of claim 6 wherein the nanosized metal particles include palladium (Pd) nanosized metal particles.

8. The method of claim 6 wherein the nanosized metal particles range in size from about 10 to about 20 nm.

9. A method of making bismuth titanate nanocubes comprising:
    mixing titanium dioxide nanotubes and a bismuth salt in an acidic bath having a pH of 0 to 1;
    reacting the titanium dioxide nanotubes and the bismuth salt in the acidic bath at a temperature from about 110° C. to about 175° C. and for a time sufficient to form bismuth titanate crystals having the formula $Bi_{12}TiO_{20}$, where Bi is bismuth; Ti is titanium or a fraction thereof between 0 and 1; and O is oxygen; and
    annealing the bismuth titanate crystals at a temperature sufficient and for a time sufficient to form bismuth titanate nanocubes.

10. The method of claim 9 wherein the time sufficient for reacting the titanium dioxide nanotubes and the bismuth salt is from about 24 hours to about 72 hours and the time sufficient for annealing the bismuth titanate crystals is from about 1 hour to about 24 hours.

11. The method of claim 9 wherein the temperature sufficient for annealing the bismuth titanate crystals is from about 100° C. to about 500° C.

12. The method of claim 9 wherein the acidic bath has a bismuth salt concentration of from about 0.1M to 3M.

13. The method of claim 9 wherein the bismuth titanate nanocubes define an elongated cube-like structure having a length of about 200 nm to about 1 micron.

14. The method of claim 9 further comprising, after annealing the bismuth titanate crystals to form bismuth titanate nanocubes, loading the bismuth titanate nanocubes with nano-sized metal particles.

15. The method of claim 9 wherein the nanosized metal particles include palladium (Pd) nanosized metal particles.

16. The method of claim 9 further comprising, after annealing the bismuth titanate crystals to form bismuth titanate nanocubes, placing the bismuth titanate nanocubes in a metal salt solution and subjecting the mixture to ultrasonication for a time sufficient to load the bismuth titanate nanocubes with the metal salt; and annealing the loaded bismuth titanate nanocubes to reduce the metal salt thereby forming bismuth titanate nanocubes that are loaded with nano-sized metal particles.

17. The method of claim 16 wherein the metal salt solution is a palladium salt solution and the nanosized metal particles are palladium (Pd) nanosized metal particles.

18. The method of claim 17 wherein the nanoparticles range in size from about 10 to about 20 nm.

* * * * *